United States Patent
Ashida et al.

(10) Patent No.: US 6,786,327 B2
(45) Date of Patent: Sep. 7, 2004

(54) CONNECTION STRUCTURE OF CHAIN FOR TRANSPORTATION

(75) Inventors: Yukio Ashida, Tokyo (JP); Masanori Fueki, Kanagawa (JP); Sumito Sato, Kanagawa (JP); Takashi Miya, Kanagawa (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 9 days.

(21) Appl. No.: 10/344,562
(22) PCT Filed: Sep. 4, 2001
(86) PCT No.: PCT/JP01/07640
§ 371 (c)(1), (2), (4) Date: Feb. 20, 2003
(87) PCT Pub. No.: WO02/20379
PCT Pub. Date: Mar. 14, 2002

(65) Prior Publication Data
US 2004/0084288 A1 May 6, 2004

(30) Foreign Application Priority Data
Sep. 5, 2000 (JP) ........................................ 2000-268357

(51) Int. Cl.[7] ............................................. B65G 17/06
(52) U.S. Cl. ........................ 198/852; 198/845; 474/211
(58) Field of Search ................................ 198/852, 845, 198/838, 712, 733; 474/209, 211

(56) References Cited

U.S. PATENT DOCUMENTS 4,294,345 A 10/1981 Stauber et al.
5,857,562 A 1/1999 Evrard

FOREIGN PATENT DOCUMENTS

JP 59-48204 11/1984
JP 10513426 12/1998

*Primary Examiner*—Joseph Valenza
(74) *Attorney, Agent, or Firm*—Greenblum & Bernstein, P.L.C.

(57) ABSTRACT

In a conveyor chain coupling structure, a block link A has a connecting rod (2) provided at one of conveying-directional ends thereof to project in the conveying direction and a coupling bore (5) formed at the other conveying-directional end. A pair of toroidal bush bearings (25, 30) is provided and a spherical bush (2) to be fixed to the connecting rod (2) is provided between the pair of toroidal bush bearings (25, 30). The first toroidal bush bearing (25) is fitted slidably on a portion, at the side of the other conveying-directional end, of the spherical bush (20) while the second toroidal bush bearing (30) is fitted at the spherical concave surface (31) thereof slidably on a portion, at the side of the one conveying-directional end, of the spherical bush (20). Owing to this construction, the coupled parts will not rattle, which will thus cause no pulsation or noise but will assure a smooth relative oscillation or reciprocal relative rotation of the block links. Further, this conveyor chain coupling structure is simplified, robust and durable than ever, and can be assembled and disassembled easily even in a narrow space. Also, the maintenance and the like can be made easily. Such jobs will be completed in a reduced time. Thus, the coupling structure very easy to handle and can be designed highly compact. Further, since it is suitable for mass production with a reduced cost of manufacture and can implement an inexpensive conveyor chain.

4 Claims, 4 Drawing Sheets

CONNECTION STRUCTURE OF CHAIN FOR TRANSPORTATION

FIELD OF THE INVENTION

The present invention generally relates to a conveyor chain formed from a plurality of block links. In the conveyor chain of this type, adjacent block links are coupled to each other for relative oscillation in all directions about a conveying direction as well as for reciprocal relative rotation about the conveying direction. More particularly, the present invention is directed to an easier-to-handle conveyor-chain coupling structure in which the adjacent block links can be oscillated smoothly in relation to each other and also reciprocally rotated smoothly in relation to each other with less rattling at the coupled parts thereof.

BACKGROUND ART

The conveyor-chain coupling structure of the above type is known from, for example, the Japanese Published Unexamined Application No. 513426 of 1998 in which there is disclosed a product support combined with each of multiple similar conveyance units serially coupled to each other in the form of an endless chain to simultaneously convey products while rotating the latter.

The above product support includes a mount plate with means for coupling the mount plate to two adjacent mount plates before and after the mount plate in consideration, a body fixed to the mount plate, and a rod supported in the body to be axially movable and freely rotatable and having a grip end formed to be removably fixed to an open end of the product.

The coupling means includes a coupling stem provided at one end of the mount plate to support a spherical cap-shaped coupling head to be born by the mount plate adjacent to the one end, and a seat provided at the other end of the mount plate, formed to have a spherical shape complementing the spherical cape shape of the coupling head and having an axial opening formed therein to allow free pass of the coupling stem of the mount plate adjacent to the other end of the mount plate in consideration. The coupling stem is supported for the spherical cap-shaped coupling head to freely be rotatable. A bearing plate is fixed perpendicularly to a free end of the coupling stem by a fixing means. The bearing plate extends generally parallel to a surface of the coupling head opposite to the spherical cap-shaped surface. Further, a toroidal rotating shaft is inserted between the opposite surfaces of the coupling head and bearing plate coaxially with the coupling stem.

While a load is being applied to the aforementioned product support in a direction in which the adjacent mount plates will be moved away from each other, the coupled parts rattle less. However, when a load is applied to the product support in a direction in which the adjacent mount plates will be moved toward each other, the coupled parts rattle much, causing a pulsation, noise or the like during travel of the conveyor chain. In addition, since the coupling between the mount plates is complicated, it is very troublesome to assemble and disassemble the coupling parts and thus maintenance of the coupling parts are not easy. Therefore, the assembling, disassembling and maintenance take a long time.

DISCLOSURE OF THE INVENTION

Accordingly, the present invention has an object to overcome the above-mentioned drawbacks of the related art by providing a conveyor chain coupling structure in which block links can oscillate smoothly in relation to each other and reciprocally rotate smoothly in relation to each other, and which is simple in construction, easy to handle and highly durable.

The above object can be attained by providing a coupling structure of a conveyor chain formed from a plurality of block links (A) coupled to each other, in which adjacent block links (A) are coupled to each other for relative oscillation in all directions about a conveying direction as well as for reciprocal relative rotation about the conveying direction, the coupling structure including according to the present invention a connecting rod (2) projecting from one of conveying-directional ends of the block link (A), a coupling bore (5) formed at the other conveying-directional end of the block link (A), a first toroidal bush bearing (25) having a spherically concave inner surface (26) and provided in the coupling bore (5) at the side of the other conveying-directional end of the block link (A), a second toroidal bush bearing (30) having a spherically concave inner surface (31) provided in the coupling bore (5) at the side of the one conveying-directional end of the block link (A), a stopper (35) provided to block the first and second toroidal bush bearings (25, 30) from coming out of the coupling bore (5), and a spherical bush (20) having a spherically convex outer surface (21), provided between the pair of toroidal bush bearings (25, 30) and fixed to the free end of the connecting rod (2), the first toroidal bush bearing (25) being fitted at the spherical concave surface (26) thereof slidably on a portion, at the side of the other conveying-directional end, of the spherically convex surface (21) of the spherical bush (20), and the second toroidal bush bearing (30) being fitted at the spherical concave surface (31) thereof slidably on a portion, at the side of the one conveying-directional end, of the spherically convex surface (21) of the spherical bush (20).

In the above conveyor chain coupling structure according to the present invention, whether a load is applied to the conveyor chain in a direction in which the adjacent block links (A) will be moved away from each other or in a direction in which they will be moved toward each other, the coupled parts will not rattle, which will thus cause no pulsation or noise during travel of the conveyor chain but will assure a smooth relative oscillation or reciprocal relative rotation of the block links (A).

Further, the coupling between the block links (A) is more simplified, robust and durable than ever, and can be assembled and disassembled more easily. Also, the maintenance and the like can be made more easily. Such jobs will be completed in a reduced time. Thus, the present invention provides a conveyor chain coupling structure very easy to handle.

More specifically, in the coupling bore (5), the first toroidal bush bearing (25) provided at the side of the other conveying-directional end of the block link (A) and second toroidal bush bearing (30) provided at the side of the one conveying-directional end of the block link (A) are blocked by the stopper (35) from coming out from the coupling bore (5), and the spherical bush (20) provided between the pair of toroidal bush bearings (23, 30) is fixed to the free end of the connecting rod (2) so that the first toroidal bush bearing (25) is slidable at the spherical concave surface (26) thereof on a portion, at the side of the other conveying-directional end, of the spherically convex surface (21) of the spherical bush (20) while the second toroidal bush bearing (30) is slidable at the spherical concave surface (31) thereof on a portion, at the side of the one conveying-directional end, of the spherically convex surface (21) of the spherical bush (20). Thus, the spherical bush (20) can easily be installed between the pair of toroidal bush bearings (25, 30) and this assembly can easily be installed into the small coupling bore (5). This installation can be made in any narrow place. Thus, the conveyor chain coupling structure itself can be designed more compact, and also since it is suitable for mass production with a reduced cost of manufacture, an inexpensive conveyor chain can be provided.

In the conveyor chain coupling structure according to the present invention, the coupling bore (5) should have a circular inner wall formed about the conveying direction and on which the toroidal bush bearings (25, 30) in pair are slidable at the outer surfaces thereof and they are reciprocally rotatable about the conveying direction inside the coupling bore (5).

In the above coupling structure, the adjacent block links (A) can be rotated more smoothly in relation to each other about the conveying direction.

In the above conveyor chain coupling structure according to the present invention, the coupling bore (5) should have an engagement step (6) formed along one open end thereof at the side of the other conveying-directional end of the block link (A) and also a stopper recess (7) formed along the open end thereof at the one conveying-directional end of the block link (A) and in which the stopper (35), generally C-shaped, is removably fitted, so that the engagement step (6) and stopper (35) work together to prevent the pair of toroidal bush bearings (25, 30) from coming out of the coupling bore (5).

In the above coupling structure, the pair of toroidal bush bearings (25, 30) can stably be provided inside the coupling bore (5) and can positively be blocked from coming out of the coupling bore (5). In addition, the stopper (35) can easily be fitted into or removed from the stopper recess (7), which will greatly contribute to easier replacement of the toroidal bush bearings (25, 30) and spherical bush (20) as well as to easier and time-saving assembling, disassembling, maintenance, etc. of such components.

BEST MODE FOR CARRYING OUT THE INVENTION

Figure 1:
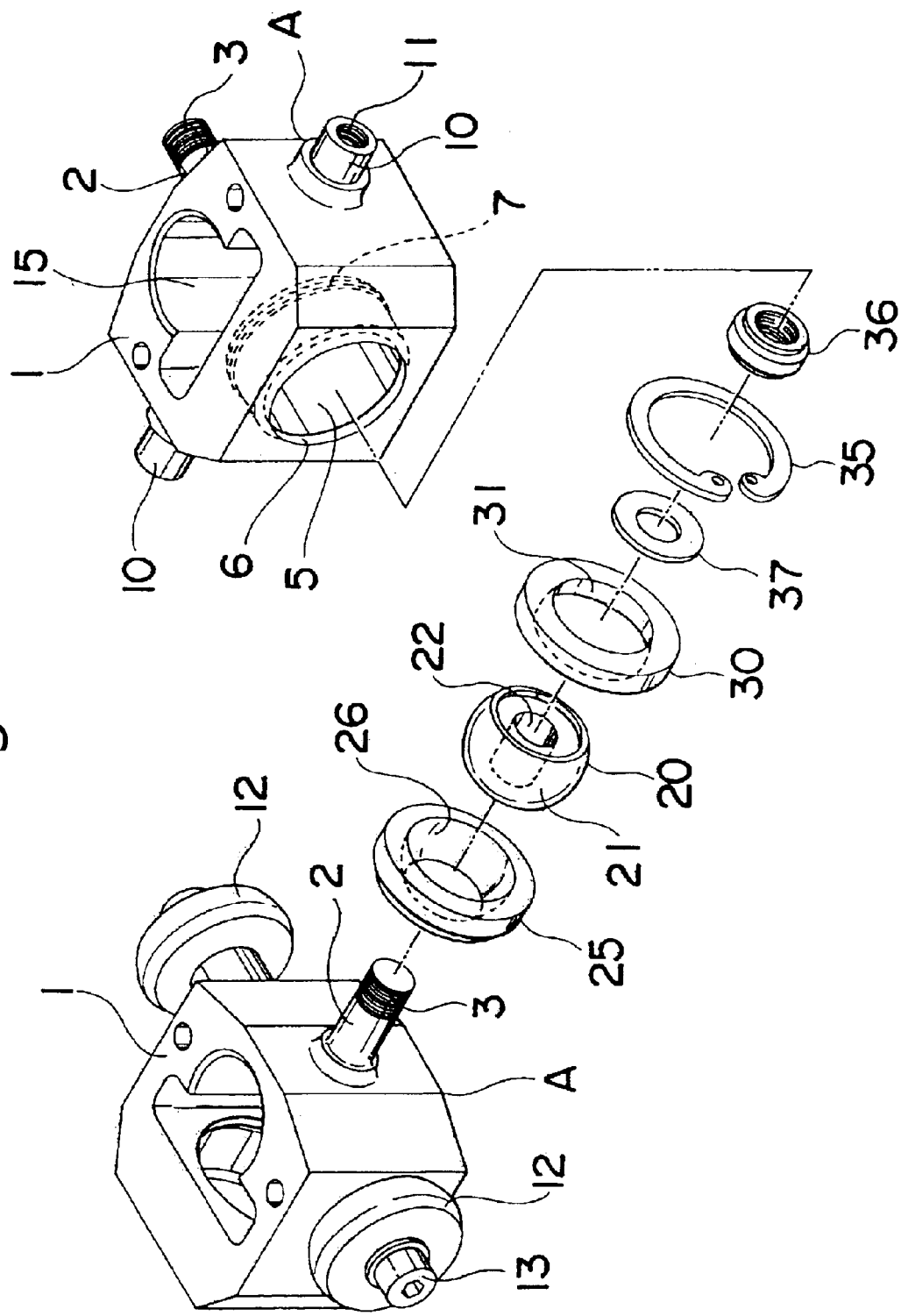
FIG. 1 is an exploded perspective view of an embodiment of the conveyor chain coupling structure according to the present invention.
Figure 2:
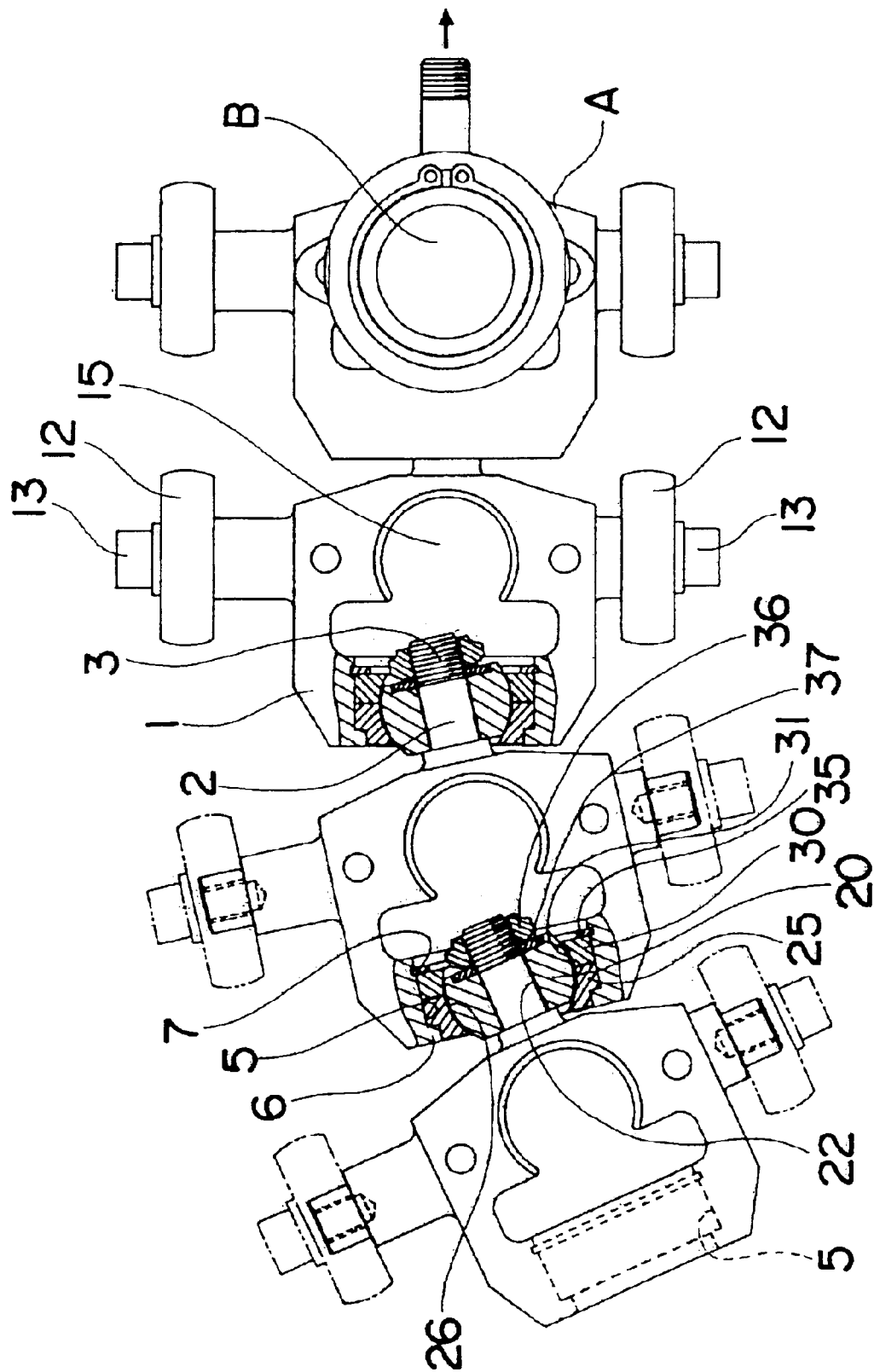
FIG. 2 is a partially fragmentary plan view of the conveyor chain coupling structure in FIG. 1.
Figure 3:
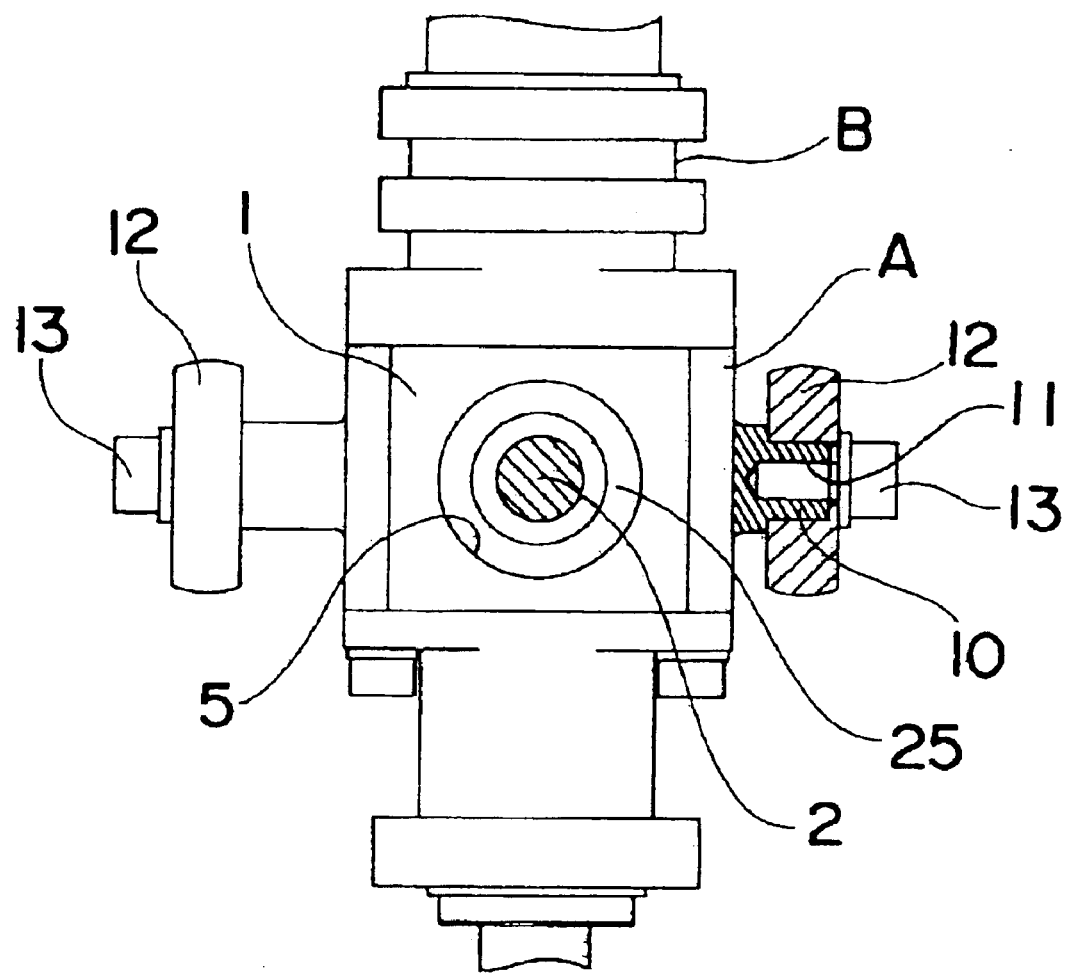
FIG. 3 is a partially fragmentary rear view of an example of the block link having the coupling structure according to the present invention and to which a product support is installed.
Figure 4:
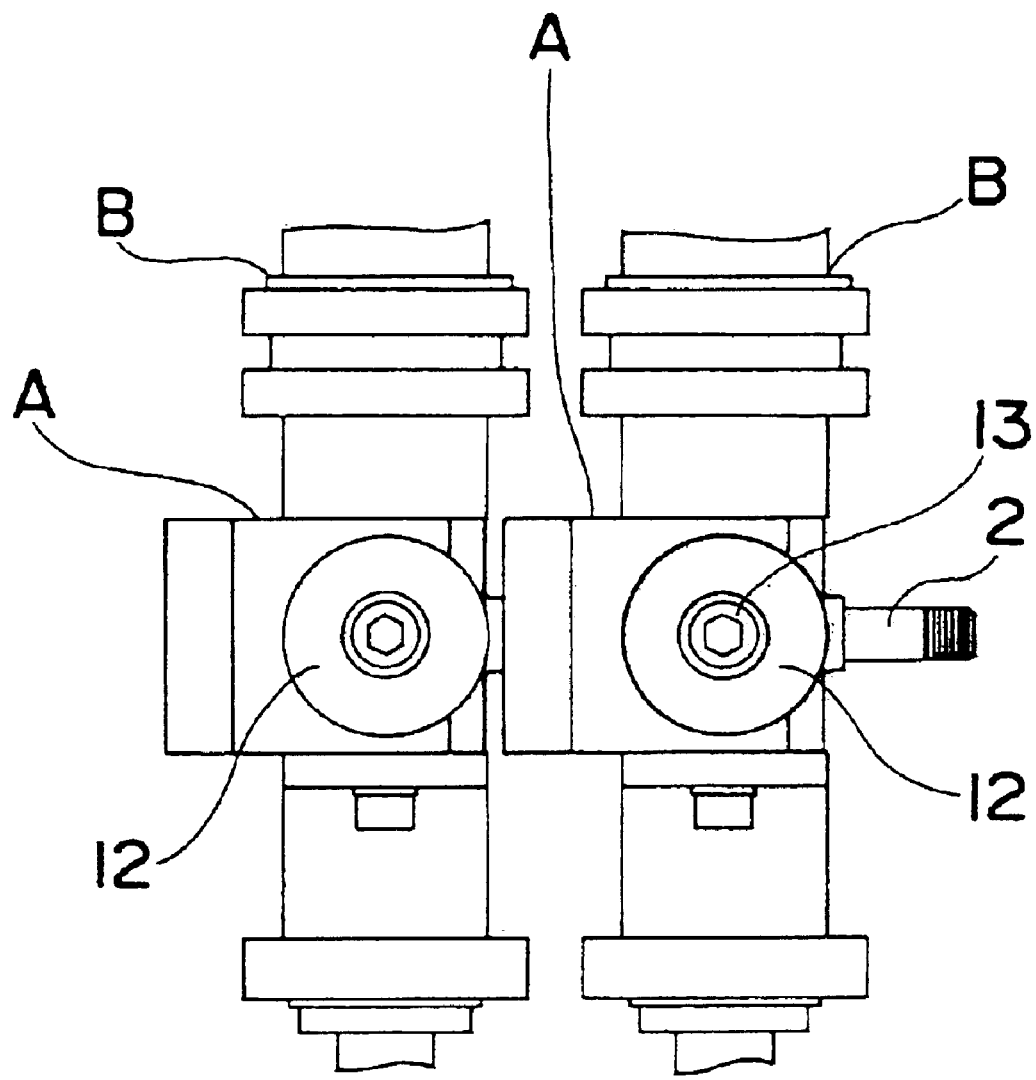
FIG. 4 is a partially fragmentary side elevation of the conveyor chain coupling structure in FIG. 1.

The embodiment of the conveyor chain coupling structure according to the present invention will be described below with reference to the accompanying drawings.

The embodiment going to be explained herebelow is an application of the present invention to a coupling structure for coupling a plurality of block links A to each other, for example, a coupling structure for a conveyor chain constructed for reciprocal relative rotation of the block links A in planes perpendicular to a direction in which products are to be conveyed, such as a conveyor chain for use to convey container products.

As shown, the coupling structure includes a connecting rod 2 provided at one end of the block link A and which projects in the conveying direction, a coupling bore 5 formed at the other conveying-directional end of the block link A, a first toroidal bush bearing 25 having a spherically concave inner surface 26 and provided in the coupling bore 5 at the side of the other conveying-directional end of the block link A, a second toroidal bush bearing 30 having a spherically concave inner surface 31 provided in the coupling bore 5 at the side of the one conveying-directional end of the block link A, a stopper 35 provided to block the first and second toroidal bush bearings 25 and 30 from coming out of the coupling bore 5, and a spherical bush 20 having a spherically convex outer surface 21, provided between the pair of toroidal bush bearings 25 and 30 and fixed to the free end of the connecting rod 2.

The first toroidal bush bearing 25 is fitted at the spherical concave surface 26 thereof slidably on a portion, at the side of the other conveying-directional end, of the spherically convex surface 21 of the spherical bush 20, and the second toroidal bush bearing 30 is fitted at the spherical concave surface 31 thereof slidably on a portion, at the side of the one conveying-directional end, of the spherically convex surface 21 of the spherical bush 20. Thus, adjacent block links A are coupled to each other for relative oscillation in all directions about a conveying direction as well as for reciprocal relative rotation about the conveying direction.

The block link A includes a block-shaped link body 1 formed from a metal, synthetic resin or any other suitable material, for example. The link body 1 has the connecting rod 2 joined thereto at the center of the front face thereof. Also, the link body 1 has a shaft 10 joined to either lateral sides thereof and on which a traveling roller 12 can be installed. The link body 1 has the coupling bore 5 formed in the center of the rear end thereof. The coupling bore 5 is open at the rear end of the link body 1. Further, the link body 1 has a vertical mount hole 15 formed through it.

The connecting rod 2 can be inserted through a hole 22 formed through the spherical bush 20. It is a round shaft whose axis is aligned with the conveying direction of the conveyor chain and has a thread 3 formed at the free end portion thereof and to which the spherical bush 20 can readily be fixed with a nut 36.

Note that the base portion of the connecting rod 2 is formed to have a larger diameter than the through-hole 22 in the spherical bush 20 such that the spherical bush 20 can be fixed at some distance from the front face of the link body 1 and also can be fixed positively by fastening the nut 36.

The coupling bore 5 has a circular inner wall whose center line is aligned with the axis of the connecting rod 2. The coupling bore 5 has an engagement step 6 formed at the other conveying-directional end thereof (along the edge of the opening in the rear end face of the link body 1) to block the toroidal bush bearing 25 from coming off and also a stopper recess 7 formed at the one conveying-directional end thereof (along the edge of the opening in the front end face of the link body 1) to removably receive the generally C-shaped stopper 35.

That is, the engagement step 6 and stopper 35 fitted in the stopper recess 7 work together to prevent the pair of toroidal bush bearings 25 and 30 from rattling while moving in the conveying direction inside the coupling bore 5.

Also, since the toroidal bush bearings 25 and 30 in pair are shaped to slide at the outer surfaces thereof on the inner wall surface of the coupling bore 5, they are reciprocally rotated about the conveying direction inside the coupling bore 5 so that adjacent block links A can reciprocally be rotated more smoothly in relation to each other in the conveying direction.

The shaft 10 is shaped in the form of a short cylinder, for example. It is internally threaded (indicated with a reference 11) at the free end portion thereof. The roller 12 can readily be installed on the shaft 10 by screwing a bolt 13 (flanged bolt, for example) into the internally threaded portion 11 of the shaft 10.

Note that the roller 12 uses a bearing or the like.

The mount hole 15 receives a product support B or the like. The mount hole 15 is formed to communicate with the one conveying-direction end of the coupling bore 5. More specifically, the block links A can be coupled to each other using the space in the mount hole 15. After the block links A are thus coupled to each other, the product support B is to be installed in the mount hole 15.

The spherical bush 20 is formed from a metal, synthetic resin or any other suitable material, for example, to a shape which will result from cutting a sphere along a pair of parallel flat planes. The through-hole 22 is formed through the spherical bush 20 in the center of the flat planes.

The pair of toroidal bush bearings 25 and 30 is formed from a metal, synthetic resin or any other suitable material, for example, to have a toroidal shape for fitting in the coupling bore 5, and has the spherically concave inner surfaces 26 and 31, respectively, formed correspondingly to the sliding spherically convex surface 21 being the outer surface of the spherical bush 20.

Note that the spherically concave inner surface 26 of the first toroidal bush bearing 25 and that 31 of the second toroidal bush bearing 30 have a curved shape which will result from bisecting a sphere. That is, by inserting the first toroidal bush bearing 25, spherical bush 20, and the second toroidal bush bearing 30 in this order into the coupling bore 5 and fitting the stopper 35 into the stopper recess 7, it is possible to easily install the toroidal bush bearings 25 and 30 and the spherical bush 20 into the coupling bore 5.

The stopper 35 is formed from a suitable metal plate to have a generally C shape, for example. Owing to the elastic deformation, the stopper 35 can removably be fitted into the stopper recess 7 in the coupling bore 5. As shown, a washer 37 is fitted on the connecting rod 2 between the spherical bush 20 and nut 36.

Note that the shapes, dimensions, materials or disposed positions of the block link A, link body 1, connection rod 2, thread 3, coupling bore 5, engagement step 6, stopper recess 7, mount hole 15, spherical bush 20, sliding spherically convex surface 21, through-hole 22, toroidal bush bearings 25 and 30, spherically concave surfaces 26 and 31, stopper 35, nut 36 and washer 37 are not limited to those having been described in the foregoing concerning the aforementioned embodiment of the conveyor chain coupling structure according to the present invention but may of course be modified or altered without departing from the scope and spirit of the present invention.

INDUSTRIAL APPLICABILITY

As having been described in the foregoing, the present invention provides such a conveyor chain coupling structure that whether a load is applied to the conveyor chain in a direction in which the adjacent block links will be moved away from each other or in a direction in which they will be moved toward each other, the coupled parts will not rattle, which will thus cause no pulsation or noise during travel of the conveyor chain but will assure a smooth relative oscillation or reciprocal relative rotation of the block links.

Further, this conveyor chain coupling structure is more simplified, robust and durable than ever, and can be assembled and disassembled more easily. Also, the maintenance and the like can be made more easily. Such jobs will be completed in a reduced time. Thus, the conveyor chain coupling structure very easy to handle and can be designed highly compact. Further, since it is suitable for mass production with a reduced cost of manufacture and can implement an inexpensive conveyor chain, the present invention is extremely usefully applicable in the field of conveyor chains used in various industries.

What is claimed is:

1. A coupling structure of a conveyor chain formed from a plurality of block links coupled to each other, in which adjacent block links are coupled to each other for relative oscillation in all directions about a conveying direction as well as for reciprocal relative rotation about the conveying direction, the coupling structure comprising:

a connecting rod projecting from one of conveying-directional ends of the block link;

a coupling bore formed at the other conveying-directional end of the block link;

a first toroidal bush bearing having a spherically concave inner surface and provided in the coupling bore at the side of the other conveying-directional end of the block link;

a second toroidal bush bearing having a spherically concave inner surface provided in the coupling bore at the side of the one conveying-directional end of the block link;

a stopper provided to block the first and second toroidal bush bearings from coming out of the coupling bore; and a spherical bush having a spherically convex outer surface, provided between the pair of toroidal bush bearings and fixed to the free end of the connecting rod;

the first toroidal bush bearing being fitted at the spherical concave surface thereof slidably on a portion, at the side of the other conveying-directional end, of the spherically convex surface of the spherical bush; and the second toroidal bush bearing being fitted at the spherical concave surface thereof slidably on a portion, at the side of the one conveying-directional end, of the spherically convex surface of the spherical bush.

2. The conveyor chain coupling structure as set forth in claim 1, wherein the coupling bore has a circular inner wall formed about the conveying direction and on which the toroidal bush bearings in pair are slidable at the outer surfaces thereof and they are reciprocally rotatable about the conveying direction inside the coupling bore.

3. The conveyor chain coupling structure as set forth in claim 1, wherein the coupling bore has an engagement step formed along one open end thereof at the side of the other conveying-directional end of the block link and also a stopper recess formed along the open end thereof at the one conveying-directional end of the block link and in which the stopper, generally C-shaped, is removably fitted, so that the engagement step and stopper work together to prevent the pair of toroidal bush bearings from coming out of the coupling bore.

4. The conveyor chain coupling structure as set forth in claim 2, wherein the coupling bore has an engagement step formed along one open end thereof at the side of the other conveying-directional end of the block link and also a stopper recess formed along the open end thereof at the one conveying-directional end of the block link and in which the stopper, generally C-shaped, is removably fitted, so that the engagement step and stopper work together to prevent the pair of toroidal bush bearings from coming out of the coupling bore.

* * * * *